(No Model.) 2 Sheets—Sheet 1.

W. S. BURLING & H. G. BIRD.
SIDE BEARING FOR CARS.

No. 473,610. Patented Apr. 26, 1892.

Witnesses,
Inventors
William S Burling
Horace G Bird
By Offield, Towle & Linthicum
Attys.

(No Model.) 2 Sheets—Sheet 2.
W. S. BURLING & H. G. BIRD.
SIDE BEARING FOR CARS.
No. 473,610. Patented Apr. 26, 1892.
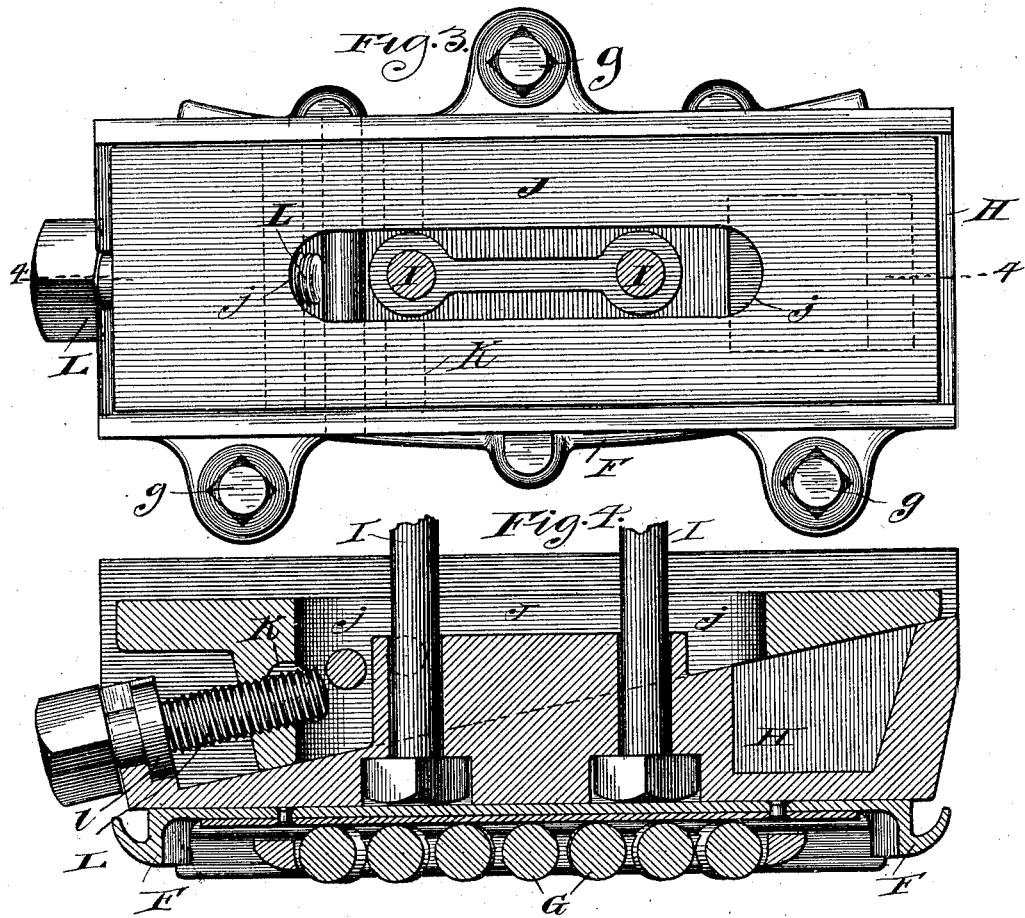
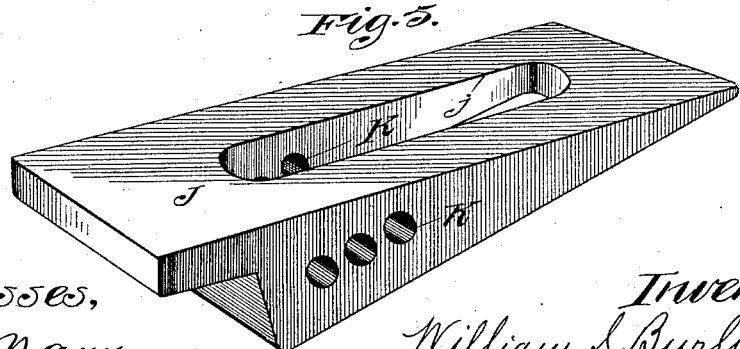
Witnesses, Inventors
William S. Burling
Horace G. Bird
By Offield, Towle & Linthicum
Attys.

UNITED STATES PATENT OFFICE.

WILLIAM S. BURLING AND HORACE G. BIRD, OF CHICAGO, ILLINOIS.

SIDE BEARING FOR CARS.

SPECIFICATION forming part of Letters Patent No. 473,610, dated April 26, 1892.

Application filed February 8, 1892. Serial No. 420,697. (No model.)

*To all whom it may concern:*

Be it known that we, WILLIAM S. BURLING and HORACE G. BIRD, citizens of the United States, residing at Chicago, Illinois, have invented certain new and useful Improvements in Side Bearings for Railway-Cars, of which the following is a specification.

This invention relates to certain improvements in side bearings for railway-cars, and has for its object to provide a side bearing which may be adjusted to accommodate settling of the frame-work of the car, the result of which is to cause the members of the side bearings to bind, whereby the free movement of the truck is prevented, the wheel-flanges are cramped upon the rails and rapidly worn, and the cramping of the wheels also causes a jarring of the car in rounding curves to the great discomfort of the passengers and the injury of the car, and the friction renders increased motive power necessary.

In the preferred construction our invention comprises a bearing consisting of two parts, one of which is in the form of a casing or box having a sliding wedge therein, which wedge may be adjusted so as to compensate for any settling of the frame of the car and provide at all times a suitably free bearing.

We have shown our invention combined with an anti-friction bearing-surface; but the latter does not necessarily form a part of the invention, although well adapted to be used in combination therewith.

Figure 1:
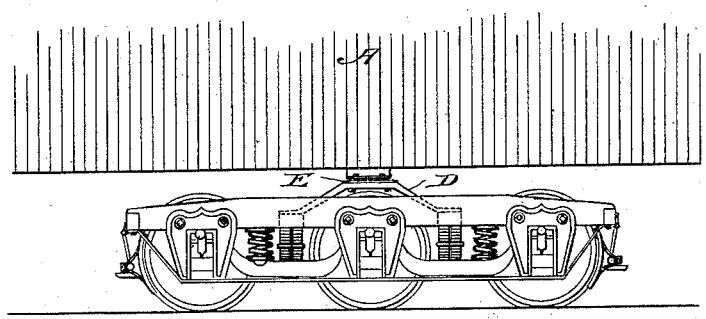
Figure 2:
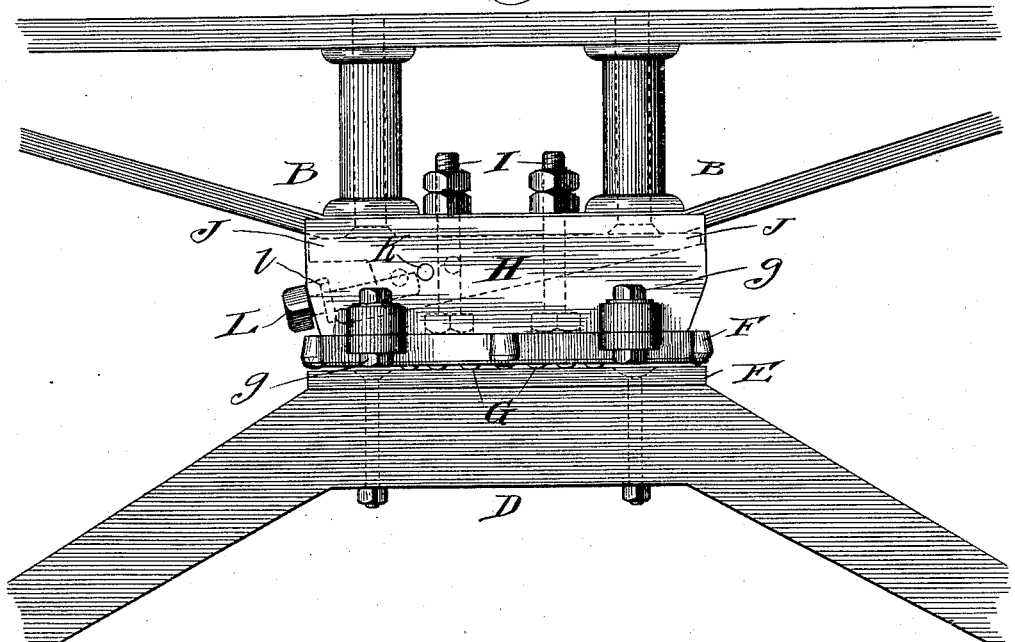

In the accompanying drawings, Figure 1 is a side elevation of a car-truck, showing a part of the car. Fig. 2 is an enlarged detail view of the bearing and connected parts. Fig. 3 is a plan view of the bearing detached, the supporting-bolts showing in section. Fig. 4 is a longitudinal section on the line 4 4 of Fig. 3. Fig. 5 is a perspective view of the wedge.

In the drawings, A represents a car-body; B, the truss for supporting the side bearing; and D, the truck side bearing, to the top of which is applied the lower member E of the side bearing, which is a plain plate of steel. In this case the contacting member or surface of that part of the bearing which is connected with the car-frame is of the roller or ball bearing type, and consists of a case F having the rollers G journaled therein, and which is suspended by means of the bolts $g$ to the case H. The latter consists of an oblong open-ended box, the bottom of which is inclined, as clearly shown in Fig. 4, and the sides of which project so as to receive between them the chord of the truss B. The case H is secured to the truss-bar by the bolts I.

J is a sliding wedge, the lower side of which conforms to the inclined bottom of the case H, so as to bear thereon. This wedge is slotted longitudinally, as seen at $j$, Fig. 5, and has preferably a number of transverse perforations K therein to receive a bolt or gudgeon, whereby it is affixed in any desired adjustment. In order to adjust the wedge the screw L may be used, said screw having a threaded engagement with the wedge and being provided with a collar $l$, which prevents its movement longitudinally, thereby effecting by its turning the movement of the wedge.

When the car is built, the side bearings will be adjusted so that the requisite play is permitted, but after some service the settling of the car-frame will tend to force the upper member of the bearing upon the lower, and unless the bearing can be adjusted there will be undue binding of the bearings, cramping of the wheels, and consequent discomfort to the passengers, injury to the car, and increased draft. No provision has been made heretofore for adjusting these bearings. Our improved device enables the adjustment to be made very readily, and the wedge may be adjusted so as to keep the bearing suitably free at all times. The nuts on the bolts I are turned so as to draw the case H up to compensate for the movement of the wedge and to withdraw the upper bearing from the lower. The projecting sides of the case H provide for the rigid lateral securement of the upper member of the bearing to the truss.

We do not limit our invention to the precise form or arrangement of parts. The upper member of the bearing may be supported in other ways than by the two central bolts shown, and the anti-friction device may be omitted.

Without limiting ourselves, therefore, to the precise details of construction, we claim—

1. In a side bearing for car-bodies, the combination, with the bearing members, of a sliding wedge adapted to be moved to compensate for the vertical approximation of the parts, substantially as described.

2. In a side bearing for car-bodies, the combination, with the upper and lower bearing members, of a sliding wedge interposed between the upper bearing member and a fixed part of the car, and means for moving the wedge, substantially as described.

3. In a side bearing for car-bodies, the combination, with the upper and lower bearing members, the upper member comprising a box or case having an inclined bottom, of a wedge resting upon said bottom and adapted to receive upon its top a fixed part of the car, and means for moving the wedge to compensate for vertical approximation of the parts of the bearing, substantially as described.

4. In a side bearing for car-bodies, the combination, with the lower or fixed member of the bearing, of an upper member comprising a box or casing, a truss depending from the car-body and having the truss-bar adapted to enter between the side walls of the box or case, bolts securing the case to the truss-bar, and a sliding wedge adapted to be moved longitudinally of the case, whereby to adjust the bearing to compensate for vertical approximation of the contacting surfaces or faces of the bearing, substantially as described.

5. In a side bearing for car-bodies, the combination, with the lower or fixed member of a bearing, of an upper member provided with an adjusting-wedge, and anti-friction devices journaled upon the lower surface of the upper bearing and adapted to bear upon the lower member, substantially as described.

WILLIAM S. BURLING.
HORACE G. BIRD.

Witnesses:
C. C. LINTHICUM,
N. M. BOND.